(12) United States Patent
Naman et al.

(10) Patent No.: US 11,511,796 B2
(45) Date of Patent: Nov. 29, 2022

(54) STEERING SYSTEM WITH DAMPING DEPENDENT SCALING FOR WHEEL IMBALANCE INDUCED VIBRATION REDUCTION

(71) Applicant: STEERING SOLUTIONS IP HOLDING CORPORATION, Saginaw, MI (US)

(72) Inventors: Apurv Naman, Saginaw, MI (US); Rangarajan Ramanujam, Saginaw, MI (US); Anthony J. Champagne, Saginaw, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 672 days.

(21) Appl. No.: 16/287,250

(22) Filed: Feb. 27, 2019

(65) Prior Publication Data
US 2020/0269910 A1    Aug. 27, 2020

(51) Int. Cl.
    *B62D 5/04*    (2006.01)
(52) U.S. Cl.
    CPC ......... *B62D 5/0472* (2013.01); *B62D 5/0463* (2013.01)
(58) Field of Classification Search
    CPC . B62D 5/00; B62D 5/001; B62D 5/04; B62D 5/0472; B62D 5/0463; B62D 5/008; B62D 5/02; B62D 5/0403; B62D 5/0406; B62D 5/0409; B62D 5/093; B62D 5/0457; B62D 5/046; B62D 1/00; B62D 1/04; B62D 1/11; B62D 3/00; B62D 3/02; B62D 3/12;
    (Continued)

(56) References Cited

U.S. PATENT DOCUMENTS

| | | | |
|---|---|---|---|
| 8,219,283 B2 | 7/2012 | Recker et al. | |
| 2016/0031481 A1* | 2/2016 | Birsching | B62D 5/06 701/36 |

FOREIGN PATENT DOCUMENTS

| | | |
|---|---|---|
| CN | 104044637 A | 9/2014 |
| CN | 104718113 A | 6/2015 |

(Continued)

OTHER PUBLICATIONS

Chinese Office Action and Search Report from the Chinese Patent Office for related Chinese Application No. 202010125160.4 dated Dec. 14, 2021, 6 page(s).

(Continued)

*Primary Examiner* — Anthony R Jimenez
(74) *Attorney, Agent, or Firm* — Dickinson Wright PLLC

(57) ABSTRACT

A method for damping dependent scaling for reducing wheel imbalance in a steering system includes determining roadwheel speed energy using a roadwheel speed signal and determining that the roadwheel speed energy is greater than a predetermined energy threshold, and in response: adjusting the roadwheel speed signal; and computing a wheel imbalance reduction command using the adjusted roadwheel speed signal. The method also includes determining that the roadwheel speed energy is not greater than the predetermined energy threshold, and in response computing the wheel imbalance reduction command using the roadwheel speed signal. The method also includes computing a motor torque command using the wheel imbalance reduction command, the motor torque command used to generate a corresponding amount of torque at a handwheel.

20 Claims, 8 Drawing Sheets

(58) Field of Classification Search
CPC .............................. B62D 6/00; B62D 6/008; B62D 6/06; B60W 10/00; B60W 10/20; B60W 50/00; B60W 50/16; B60W 2510/20; B60W 2510/202; B60W 2710/20; B60W 2710/202; B60W 2710/205; B60W 2710/207
See application file for complete search history.

(56) References Cited

FOREIGN PATENT DOCUMENTS

| | | |
|---|---|---|
| CN | 105313962 A | 2/2016 |
| CN | 107031709 A | 8/2017 |
| CN | 107867320 A | 4/2018 |
| DE | 102014204097 A1 | 9/2014 |
| DE | 102015112360 A1 | 2/2016 |
| DE | 102016122713 A1 | 6/2017 |
| EP | 2353968 A1 | 8/2011 |
| JP | 2010052640 A | 3/2010 |

OTHER PUBLICATIONS

German Examination Request with English translation for German Application No. 10 2020 104 442.9 dated Feb. 16, 2022, 12 pages.

* cited by examiner

STEERING SYSTEM WITH DAMPING DEPENDENT SCALING FOR WHEEL IMBALANCE INDUCED VIBRATION REDUCTION

BACKGROUND

Roadwheel imbalance is frequent problem with vehicles, and can cause discomfort to the vehicle driver and occupants. Particularly, at high speeds such as 70 KPH, and above, unwanted vibration of handwheel is observed even with a slight imbalance in the roadwheels.

SUMMARY

Technical solutions are described for damping dependent scaling for wheel imbalance induced vibration reduction in steering systems. According to one or more embodiments, an example method includes determining roadwheel speed energy using a roadwheel speed signal. The method further includes determining that the roadwheel speed energy is greater than a predetermined energy threshold, and in response, adjusting the roadwheel speed signal, and computing a wheel imbalance reduction using the adjusted roadwheel speed signal. The method further includes, in case of determining that roadwheel speed energy is not greater than the predetermined energy threshold, and in response computing the wheel imbalance reduction using the roadwheel signal, without any adjustment. The method further includes computing a motor torque command using the wheel imbalance reduction, the motor torque command used to generate a corresponding amount of torque at a handwheel.

According to one or more embodiments, a steering system includes a processor that performs a damping dependent scaling for wheel imbalance reduction. The damping dependent scaling includes performing a method that includes determining roadwheel speed energy using a roadwheel speed signal. The method further includes determining that the roadwheel speed energy is greater than a predetermined energy threshold, and in response, adjusting the roadwheel speed signal, and computing a wheel imbalance reduction using the adjusted roadwheel speed signal. The method further includes determining that roadwheel speed energy is not greater than the predetermined energy threshold, and in response computing the wheel imbalance reduction using the roadwheel signal. The method further includes computing a motor torque command using the wheel imbalance reduction, the motor torque command used to generate a corresponding amount of torque at a handwheel.

According to one or more embodiments, a computer program product includes a memory device having computer executable instructions stored therein, the computer executable instructions when executed by a processor cause the processor to perform a method for damping dependent scaling for wheel imbalance reduction in a steering system. The method includes determining roadwheel speed energy using a roadwheel speed signal. The method further includes determining that the roadwheel speed energy is greater than a predetermined energy threshold, and in response, adjusting the roadwheel speed signal, and computing a wheel imbalance reduction using the adjusted roadwheel speed signal. The method further includes, in case of determining that roadwheel speed energy is not greater than the predetermined energy threshold, and in response computing the wheel imbalance reduction using the roadwheel signal, without any adjustment. The method further includes computing a motor torque command using the wheel imbalance reduction, the motor torque command used to generate a corresponding amount of torque at a handwheel.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

As used herein the terms module and sub-module refer to one or more processing circuits such as an application specific integrated circuit (ASIC), an electronic circuit, a processor (shared, dedicated, or group) and memory that executes one or more software or firmware programs, a combinational logic circuit, and/or other suitable components that provide the described functionality. As can be appreciated, the sub-modules described below can be combined and/or further partitioned.

It should be noted that the various technical features described herein facilitate improvements to motor control systems. The description herein uses an electric power steering system (EPS) as an example that uses a motor control system, which is improved using and/or implementing the various technical features described herein. However, the technical solutions described herein are not limited to electric power steering systems, rather are applicable in motor control systems used in any other system, such as an industrial motor, a biomechanical device, an automated drive assist system, or any other electric machine that uses a motor control system.

Figure 1:
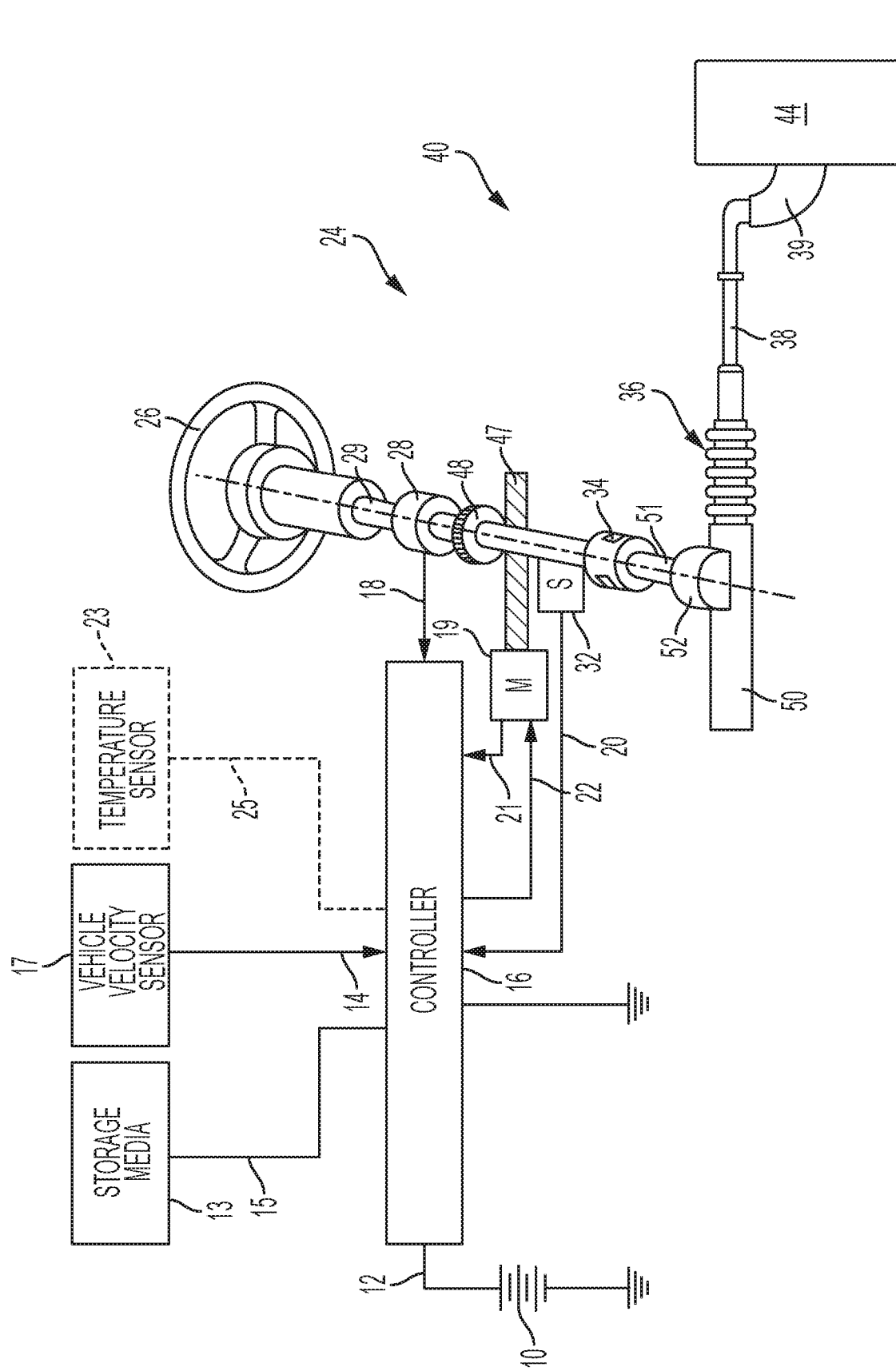
FIG. 1 is an exemplary embodiment of an electric power steering system according to one or more embodiments.

Referring now to the Figures, where the technical solutions will be described with reference to specific embodiments, without limiting same, FIG. 1 is an exemplary embodiment of an electric power steering system (EPS) 40 suitable for implementation of the disclosed embodiments, although the technical solutions described herein can be used for any type of steering system such as, REPS, CEPS, PEPS. The steering mechanism 36 is a rack-and-pinion type system and includes a toothed rack (not shown) within housing 50 and a pinion gear (also not shown) located under gear housing 52. As the operator input, hereinafter denoted as a steering wheel 26 (e.g. a hand wheel and the like) is turned, the upper steering shaft 29 turns and the lower steering shaft 51, connected to the upper steering shaft 29 through universal joint 34, turns the pinion gear. Rotation of the pinion gear moves the rack, which moves tie rods 38 (only one shown) in turn moving the steering knuckles 39 (only one shown), which turn a steerable wheel(s) 44 (only one shown).

Electric power steering assist is provided through the control apparatus generally designated by reference numeral 24 and includes the controller 16 and an electric machine 19, which includes a permanent magnet synchronous motor, and is hereinafter denoted as motor 19. The controller 16 is powered by the vehicle power supply 10 through line 12. The controller 16 receives a vehicle speed signal 14 representative of the vehicle velocity from a vehicle velocity sensor 17. Steering angle is measured through position sensor 32, which may be an optical encoding type sensor, variable resistance type sensor, or any other suitable type of position sensor, and supplies to the controller 16 a position signal 20. Motor velocity may be measured with a tachometer, or any other device, and transmitted to controller 16 as a motor velocity signal 21. A motor velocity denoted $\omega_m$ may be measured, calculated or a combination thereof. For example, the motor velocity $\omega_m$ may be calculated as the change of the motor position $\theta$ as measured by a position sensor 32 over a prescribed time interval. For example, motor velocity $\omega_m$ may be determined as the derivative of the motor position $\theta$ from the equation $\omega_m = \Delta\theta/\Delta t$ where $\Delta t$ is the sampling time and $\Delta\theta$ is the change in position during the sampling interval. Alternatively, motor velocity may be derived from motor position as the time rate of change of position. It will be appreciated that there are numerous well-known methodologies for performing the function of a derivative.

As the steering wheel 26 is turned, torque sensor 28 senses the torque applied to the steering wheel 26 by the vehicle operator. The torque sensor 28 may include a torsion bar (not shown) and a variable resistive-type sensor (also not shown), which outputs a variable torque signal 18 to controller 16 in relation to the amount of twist on the torsion bar. Although this is one type of torque sensor, any other suitable torque-sensing device used with known signal processing techniques will suffice. In response to the various inputs, the controller sends a command 22 to the electric motor 19, which supplies torque assist to the steering system through worm 47 and worm gear 48, providing torque assist to the vehicle steering.

It should be noted that although the disclosed embodiments are described by way of reference to motor control for electric steering applications, it will be appreciated that such references are illustrative only and the disclosed embodiments may be applied to any motor control application employing an electric motor, e.g., steering, valve control, and the like. Moreover, the references and descriptions herein may apply to many forms of parameter sensors, including, but not limited to torque, position, speed and the like. It should also be noted that reference herein to electric machines including, but not limited to, motors, hereafter, for brevity and simplicity, reference will be made to motors only without limitation.

In the control system 24 as depicted, the controller 16 utilizes the torque, position, and speed, and like, to compute a command(s) to deliver the required output power. Controller 16 is disposed in communication with the various systems and sensors of the motor control system. Controller 16 receives signals from each of the system sensors, quantifies the received information, and provides an output command signal(s) in response thereto, in this instance, for example, to the motor 19. Controller 16 is configured to develop the corresponding voltage(s) out of inverter (not shown), which may optionally be incorporated with controller 16 and will be referred to herein as controller 16, such that, when applied to the motor 19, the desired torque or position is generated. In one or more examples, the controller 24 operates in a feedback control mode, as a current regulator, to generate the command 22. Alternatively, in one or more examples, the controller 24 operates in a feedforward control mode to generate the command 22. Because these voltages are related to the position and speed of the motor 19 and the desired torque, the position and/or speed of the rotor and the torque applied by an operator are determined. A position encoder is connected to the steering shaft 51 to detect the angular position $\theta$. The encoder may sense the rotary position based on optical detection, magnetic field variations, or other methodologies. Typical position sensors include potentiometers, resolvers, synchros, encoders, and the like, as well as combinations comprising at least one of the forgoing. The position encoder outputs a position signal 20 indicating the angular position of the steering shaft 51 and thereby, that of the motor 19.

Desired torque may be determined by one or more torque sensors 28 transmitting torque signals 18 indicative of an applied torque. One or more exemplary embodiments include such a torque sensor 28 and the torque signal(s) 18 therefrom, as may be responsive to a compliant torsion bar, T-bar, spring, or similar apparatus (not shown) configured to provide a response indicative of the torque applied.

In one or more examples, a temperature sensor(s) 23 located at the electric machine 19. Preferably, the temperature sensor 23 is configured to directly measure the temperature of the sensing portion of the motor 19. The temperature sensor 23 transmits a temperature signal 25 to the controller 16 to facilitate the processing prescribed herein and compensation. Typical temperature sensors include thermocouples, thermistors, thermostats, and the like, as well as combinations comprising at least one of the foregoing sensors, which when appropriately placed provide a calibratable signal proportional to the particular temperature.

The position signal 20, velocity signal 21, and a torque signal(s) 18 among others, are applied to the controller 16. The controller 16 processes all input signals to generate values corresponding to each of the signals resulting in a rotor position value, a motor velocity value, and a torque value being available for the processing in the algorithms as prescribed herein. Measurement signals, such as the above mentioned are also commonly linearized, compensated, and filtered as desired to enhance the characteristics or eliminate undesirable characteristics of the acquired signal. For example, the signals may be linearized to improve processing speed, or to address a large dynamic range of the signal. In addition, frequency or time based compensation and filtering may be employed to eliminate noise or avoid undesirable spectral characteristics.

In order to perform the prescribed functions and desired processing, as well as the computations therefore (e.g., the identification of motor parameters, control algorithm(s), and the like), controller 16 may include, but not be limited to, a processor(s), computer(s), DSP(s), memory, storage, register(s), timing, interrupt(s), communication interface(s), and input/output signal interfaces, and the like, as well as combinations comprising at least one of the foregoing. For example, controller 16 may include input signal processing and filtering to enable accurate sampling and conversion or acquisitions of such signals from communications interfaces. Additional features of controller 16 and certain processes therein are thoroughly discussed at a later point herein.

As described earlier, a technical challenge with the steering system 40 is an undesired vibration of the handwheel 26 is observed even with a slight imbalance in the roadwheels 44. Existing roadwheel imbalance rejection (WIR) techniques to reduce such unwanted handwheel vibrations due to roadwheel imbalance minimize the handwheel oscillation during an imbalance event by using LMS (least mean square) approach. Typically, the roadwheel speed frequency change is used as a reference signal to track correlated disturbances in the handwheel 26 and eventually the disturbances are canceled out. The LMS filter described above computes the cancellation command using the following equations, in one or more examples: $W(n+1)=W(n)+2\mu \cdot e(n) \cdot x(n)$, where $\mu$=Adaptive step size which defines the convergence rate, $e(n)$=Difference between Filter output and Accelerometer signal is an error signal that is to be minimized, and $x(n)$=Reference signal (Output of reference signal generator 410). Therefore, the output of the filter is: $Y(n)=W(n+1)\cdot x(n)$, which is the cancellation command.

The existing techniques may not cancel out the vibrations in the handwheel 26 during acceleration (and/or deceleration). The technical challenge with the existing WIR techniques can be because of the manner in which the roadwheel speed signal behaves during acceleration. It should be noted that as used herein, "acceleration" can include an increase or a decrease in the vehicle speed. Whenever there is an acceleration with the imbalance, a spike in the roadwheel speed frequency signal can be observed, the spike changing both, amplitude and frequency of the signal. However, although the frequency content is observed to be increasing as expected, there is a drop in magnitude of the roadwheel speed signal. Due to this drop in magnitude the, the existing WIR techniques fail to reduce disturbance in the handwheel.

The technical solutions described herein address such technical challenges by using damping dependent scaling. The technical solutions described herein facilitate scaling of the roadwheel speed signal in scenarios where the amplitude of the roadwheel speed signal does not correlate to oscillations in handwheel 26 anymore (although frequency may correlate). The scaling is a function of velocity, longitudinal acceleration, and energy of the roadwheel speed signal, or other equivalent signals that facilitate capturing the vehicle conditions during which energy of the oscillations/vibrations is high (above a predetermined threshold). The technical solutions described herein facilitate scaling up the roadwheel speed signal whenever there is an acceleration above the acceleration threshold. This causes a corresponding increase in the WIR command (as provided by existing WIR techniques) or the motor torque and hence dampens out the handwheel oscillations.

Further, the existing techniques are designed for steady state when the driver holds a certain vehicle speed, such as typical highway speeds (e.g. >75 KPH, etc.). Accordingly, during transient speed changes, the existing WIR techniques do not prevent vibrations in the handwheel due to roadwheel imbalance. The damping dependent scaling based technical solutions described herein address such technical challenges as well.

Figure 2:
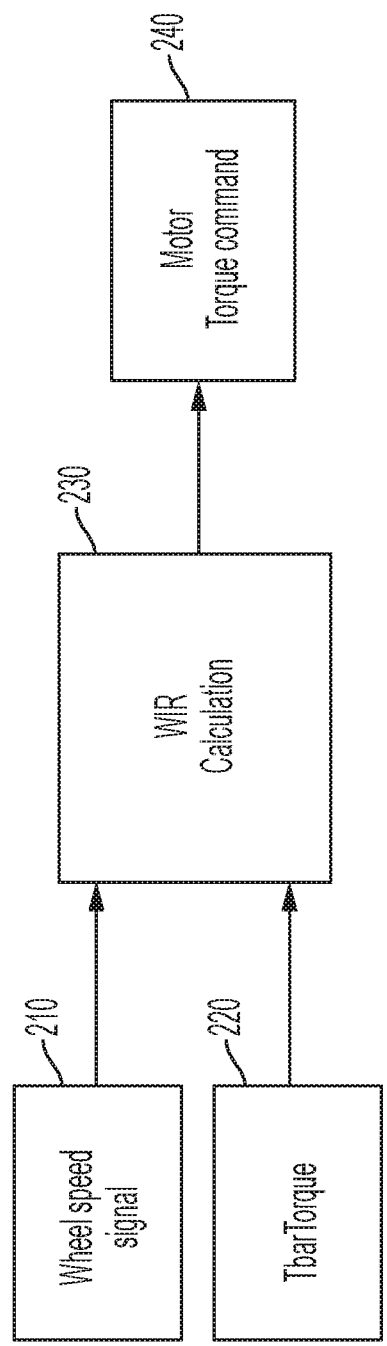
FIG. 2 depicts a block diagram of the existing WIR technique to reduce handwheel vibration.

FIG. 2 depicts a block diagram of the existing WIR technique to reduce handwheel vibration. The WIR calculation correlates disturbances in roadwheel speed frequency signal to Tbar torque 220 to cancel the handwheel vibrations. The Tbar torque 220 is the torque that is back driven from roadwheel to the handwheel 26 due to imbalance felt by the driver in our case. A WIR calculation 230 receives the Tbar torque 220 and the roadwheel speed 210 signals to perform the correlation, for example, using LMS techniques. The correlation determines the amount of oscillations at the handwheel 26 caused by the roadwheel imbalance. Based on the correlation, the WIR calculation 230 computes a motor torque command 240 that is applied to the motor 19 to generate a corresponding amount of torque to cancel the disturbance, and thus, prevent the vibrations at the handwheel 26. However, as described earlier, in such techniques, during transient speed conditions, the wheel speed frequency signal content is lost, and thus, the vibrations at the handwheel 26 are not completely prevented.

Figure 3:
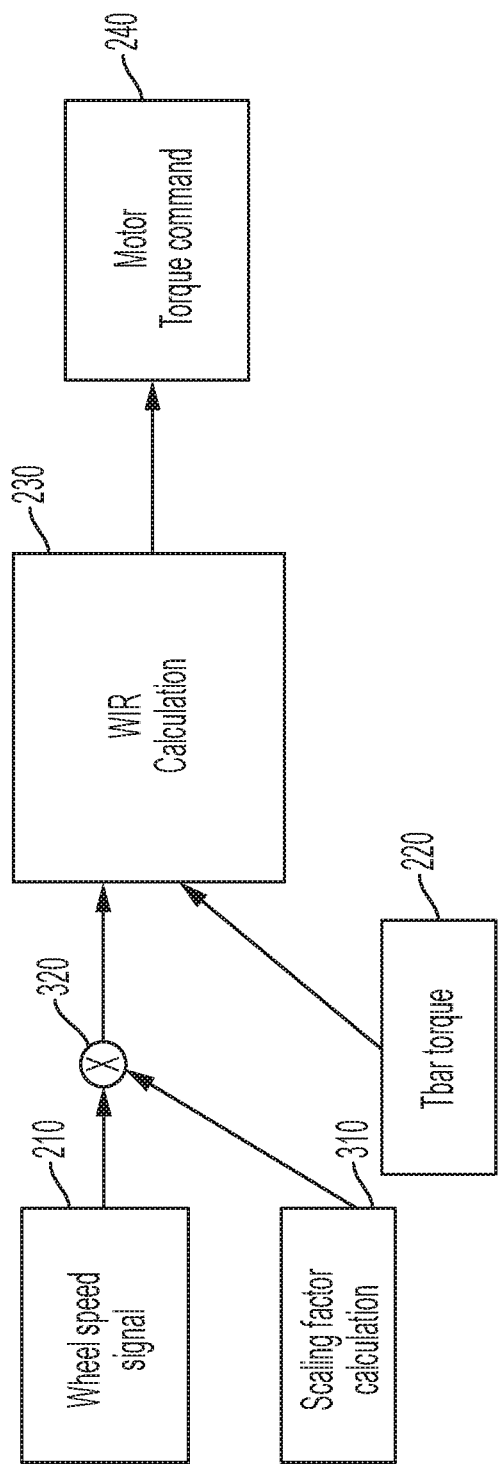
FIG. 3 depicts a block diagram for the damping dependent scaling of the WIR according to one or more embodiments.

FIG. 3 depicts a block diagram for the damping dependent scaling of the WIR according to one or more embodiments. The damping dependent scaling modifies the existing techniques by scaling (320) the roadwheel speed 210 using a scaling factor 310 that is dependent on one or more of the following conditions—vehicle speed, longitudinal acceleration of the vehicle, and wheel speed energy.

Figure 4:
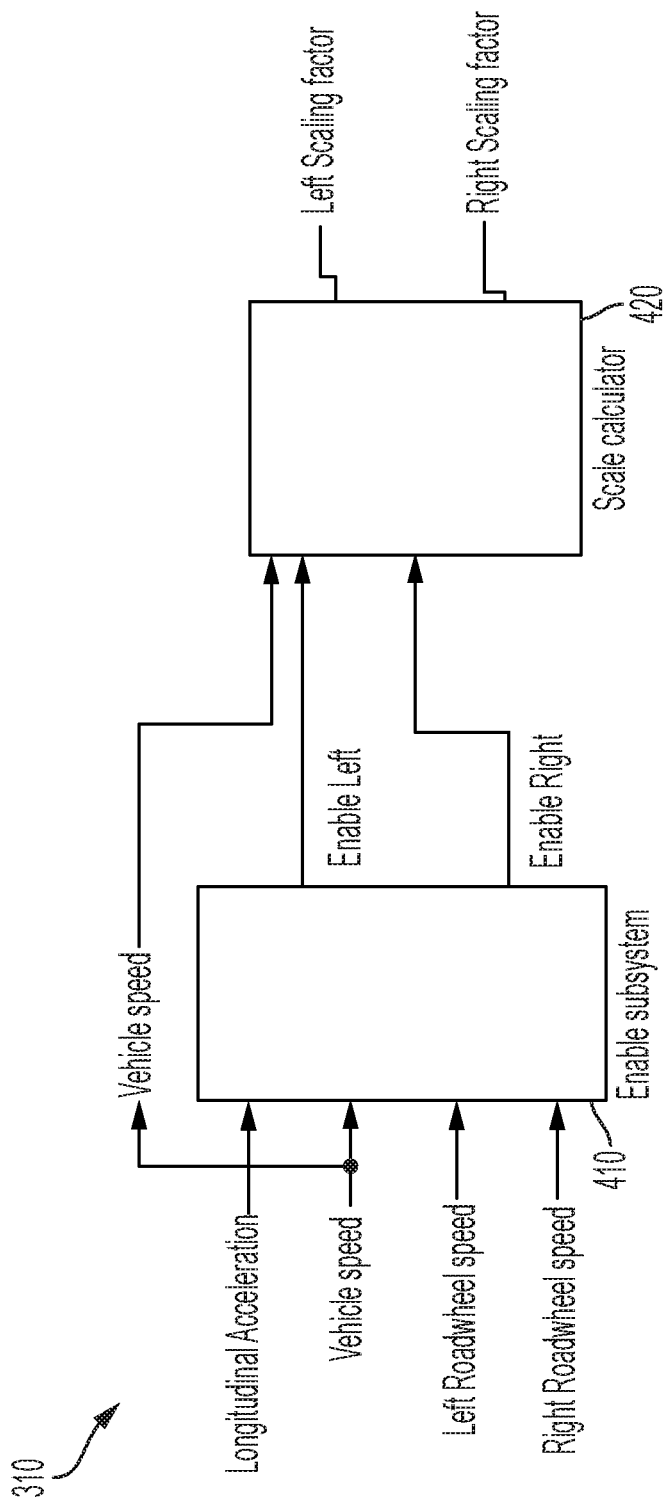
FIG. 4 depicts a block diagram for the scaling factor calculation according to one or more embodiments.

FIG. 4 depicts a block diagram for the scaling factor calculation according to one or more embodiments. The scaling calculation 310 includes an enable block 410 and a scale calculator 420. Each of the blocks depicted for FIG. 4, and other FIGs. can be implemented as a module of an electronic circuit, each module being an electronic circuit in itself. Alternatively, or in addition, each module can include computer executable instructions that cause a method to be performed when executed by a processor.

Referring to FIG. 4, the enable block 410 controls the vehicle conditions under which the scaling is to be applied for both left and right roadwheel speeds separately. When the enable signal, that is output by the enable block 410, is TRUE, the scaling block 420 uses vehicle speed to calculate the scaling factors for the left and the right roadwheel speeds.

Figure 5:
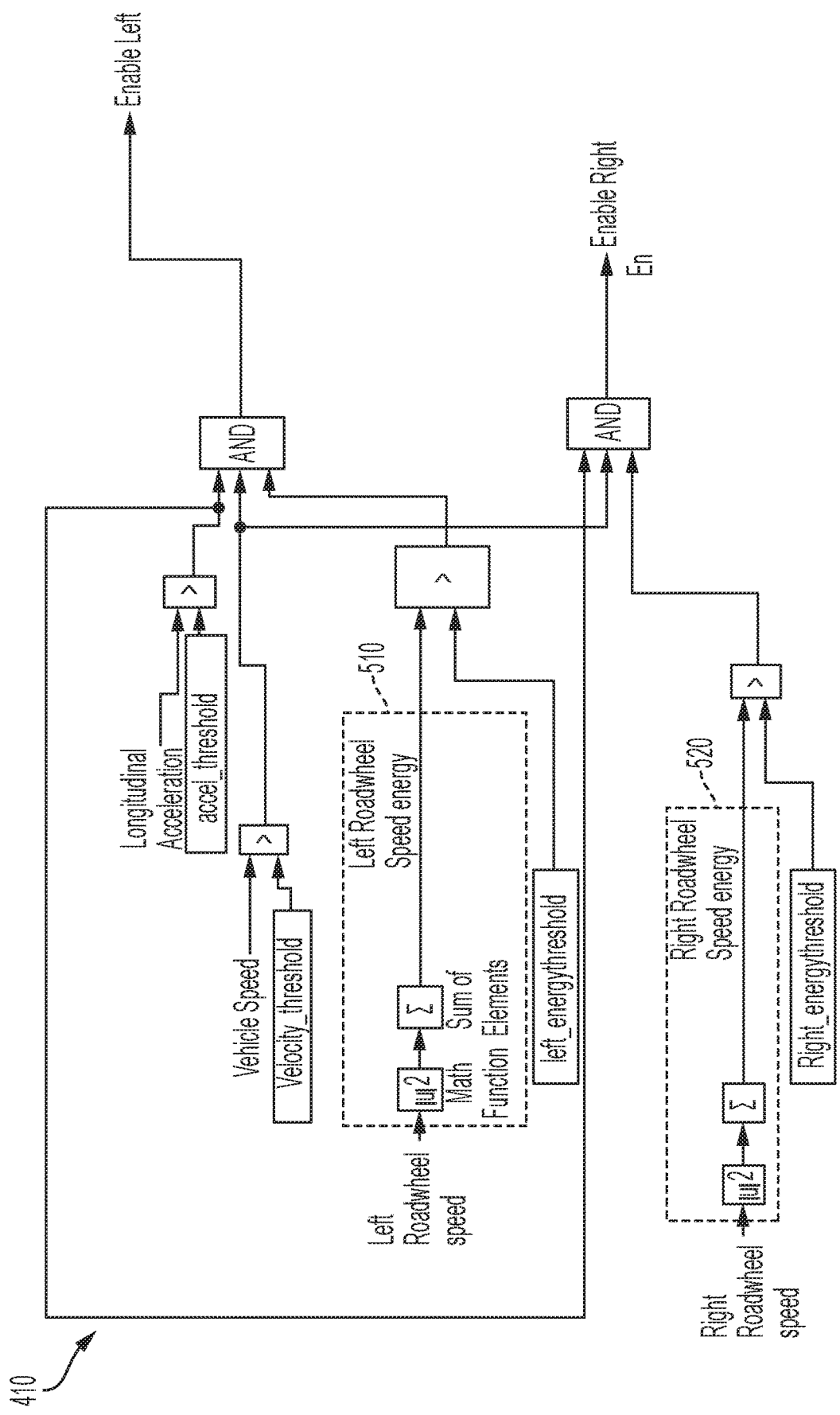
FIG. 5 depicts a block diagram for determining the enable signals according to one or more embodiments.

FIG. 5 depicts a block diagram for determining the enable signals according to one or more embodiments. The enable block 410 determines and outputs an enable left output signal and an enable right output signal. It is understood that in one or more examples, the enable right and enable left blocks can be separated into distinct blocks. The enable left signal indicates whether to scale the left roadwheel speed for WIR calculation, and the enable right signal indicates whether to scale the right roadwheel speed for the WIR calculation.

The enable block 410 receives a left roadwheel speed, a longitudinal acceleration of the vehicle, and a vehicle speed. The left roadwheel speed is used to compute a left roadwheel speed energy. Similarly, for the right roadwheel, the enable block 410 receives a right roadwheel speed, which is used to compute a right roadwheel speed energy. The roadwheel speed energy is used to determine if there is imbalance in the roadwheels or not. The goal is to switch off the scaling when there is no imbalance in the roadwheels. In one or more examples, based on the roadwheel speed energy and signal processing techniques, the scaling can be made to smoothen the handwheel vibrations.

It should be noted that although separate left and right roadwheel speeds are used to compute separate roadwheel speed energy values, in one or more implementations a combined roadwheel speed energy value can be computed. Such a combined value can be computed based on a combined roadwheel speed value for both, the left and right front wheels. In both these cases the undesired vibration that is caused at the handwheel because of roadwheel imbalance is reduced. The undesired vibration in the handwheel can be from any separate source: Left wheel, right wheel or both. This is because the imbalance can originate from the left/right or both and they need to be accounted for independently.

Calculating the roadwheel speed energy for both, the left and the right roadwheel is performed as follows:

$$\text{Wheel speed energy} = [X(n)] * [X(n)]^T, \text{ where}$$
$$\text{array } [X(n)] = [x(0), x(1) \ldots x(n-1)], \text{ and}$$
$$\text{where } x(j) \text{ is filtered wheel speed at } t = j \text{ seconds}$$

FIG. 5 depicts this calculation being performed (510, 520) for both the left and the right roadwheel speeds. The wheel speed energy is a measure of how much imbalance is present in the roadwheel 44. This condition enables and disables scaling depending on level of imbalance present in the roadwheels 44. If there is no imbalance the scaling is turned off (enable signal=FALSE). The roadwheel speed energy is calculated (510, 520) by creating a matrix that includes n delays out of the filtered roadwheel speed and then taking the absolute of the matrix multiplication of the given matrix with its transpose.

Determining the enable signal for each vehicle further includes comparing the computed roadwheel speed energy with a predetermined energy threshold value. Additionally, the vehicle speed and the longitudinal acceleration are also compared with corresponding vehicle speed threshold and longitudinal acceleration threshold values, respectively. If all three threshold value comparisons are valid, the enable signal is set to TRUE, else to FALSE. The comparison is valid, in one or more examples, if the signal values exceed the corresponding predetermined threshold values. The conditions logic for generating a TRUE enable left/right signal can be represented as follows:

Longitudinal acceleration>Acceleration Threshold
    AND Vehicle speed>Velocity threshold AND
    Wheel speed energy (left/right)>Energy Threshold Alternatively, or in addition, the signal values have to be less than the corresponding predetermined threshold values. The left enable and the right enable signals are received by the scale calculator block 420 (FIG. 4).

Accordingly, the enable block 410 captures driving conditions which represent rapid accelerations when the vehicle is above a certain velocity with imbalance in any of the roadwheels 44.

Figure 6:
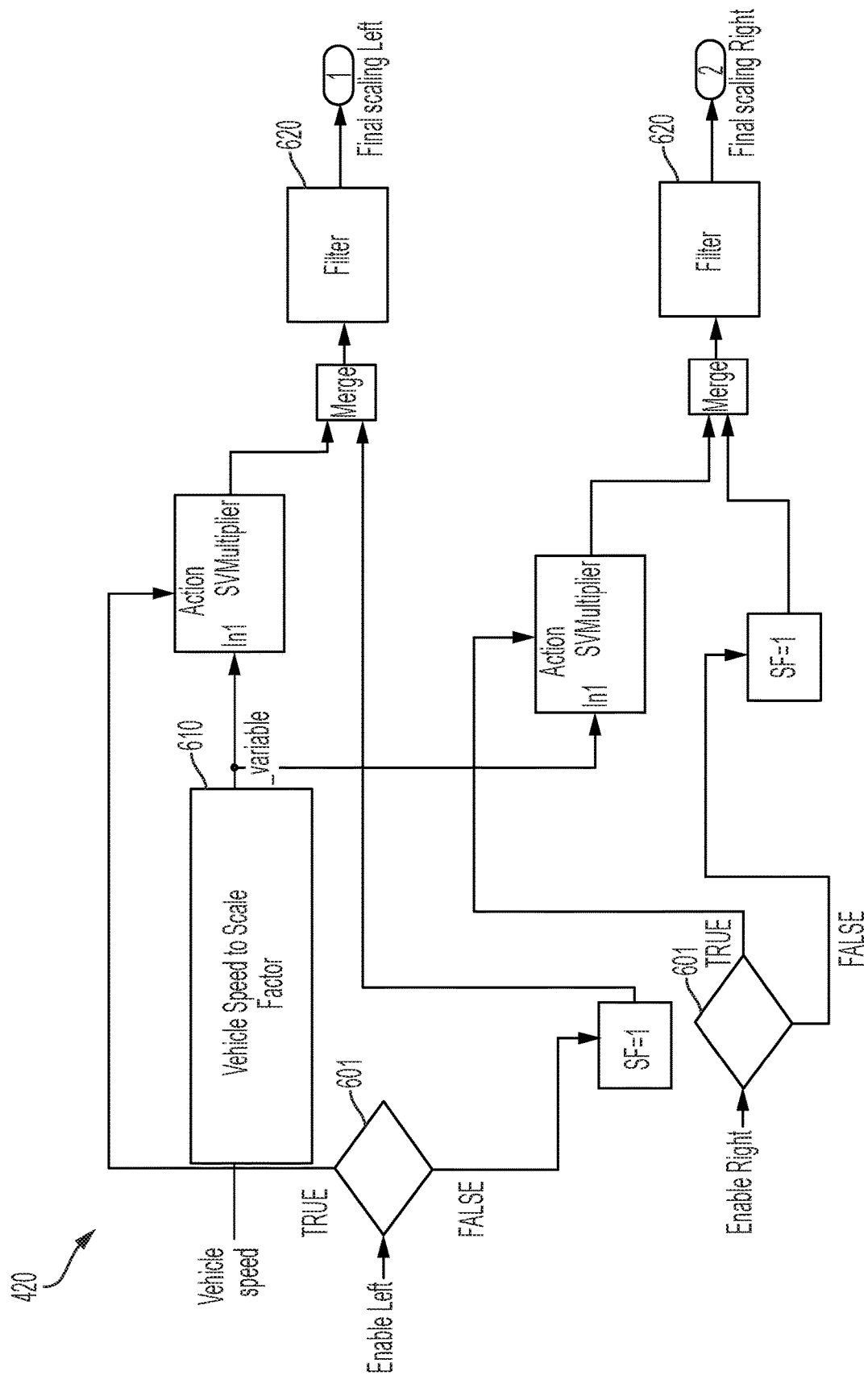
FIG. 6 depicts a block diagram for computing the scaling factors according to one or more embodiments.

FIG. 6 depicts a block diagram for computing the scaling factors according to one or more embodiments. The scaling block 420 computes the amount of scaling required when the output(s) of the enable block 410 is TRUE (601). The scaling block 420, in one or more examples, determines the scaling factor(s) based on a lookup table (610), which takes in vehicle speed as an input. The lookup table (610) used to calculate the scale factors based on velocity facilitates the scale factor values to increase with increase in vehicle speed.

A low pass filter (620) is added to the output to prevent from rapid jumping of the scaling factor. When the enable output(s) of the enable block 410 is FALSE (601), the scaling factor(s) is scaled down to Unity (1). The merge module(s) 615 receives two input signal and outputs whichever one of the two is TRUE (or a first predetermined value). The input signal which is FALSE (second predetermined value) is ignored and the TRUE signal is passed through.

Accordingly, based on the condition logic described, the scaling block 420 computes the left scaling factor and the right scaling factor based on the present value and a trend of the vehicle speed.

The scaling factors are applied to the roadwheel speed signal command that is used for the WIR calculation 230, which in turn is used for generating a torque command 240 at the handwheel 26. The torque command 240 is based on the input torque from the driver, among other factors. The torque command 240 is adjusted using the WIR calculation 230 to reduce, and potentially eliminate, undesired vibrations in the handwheel 26 caused by the wheel imbalance, and particularly in the given conditions. The WIR calculation 230 can be performed using any known techniques, such as using least mean square, adaptive filtering, etc.

Figure 7:
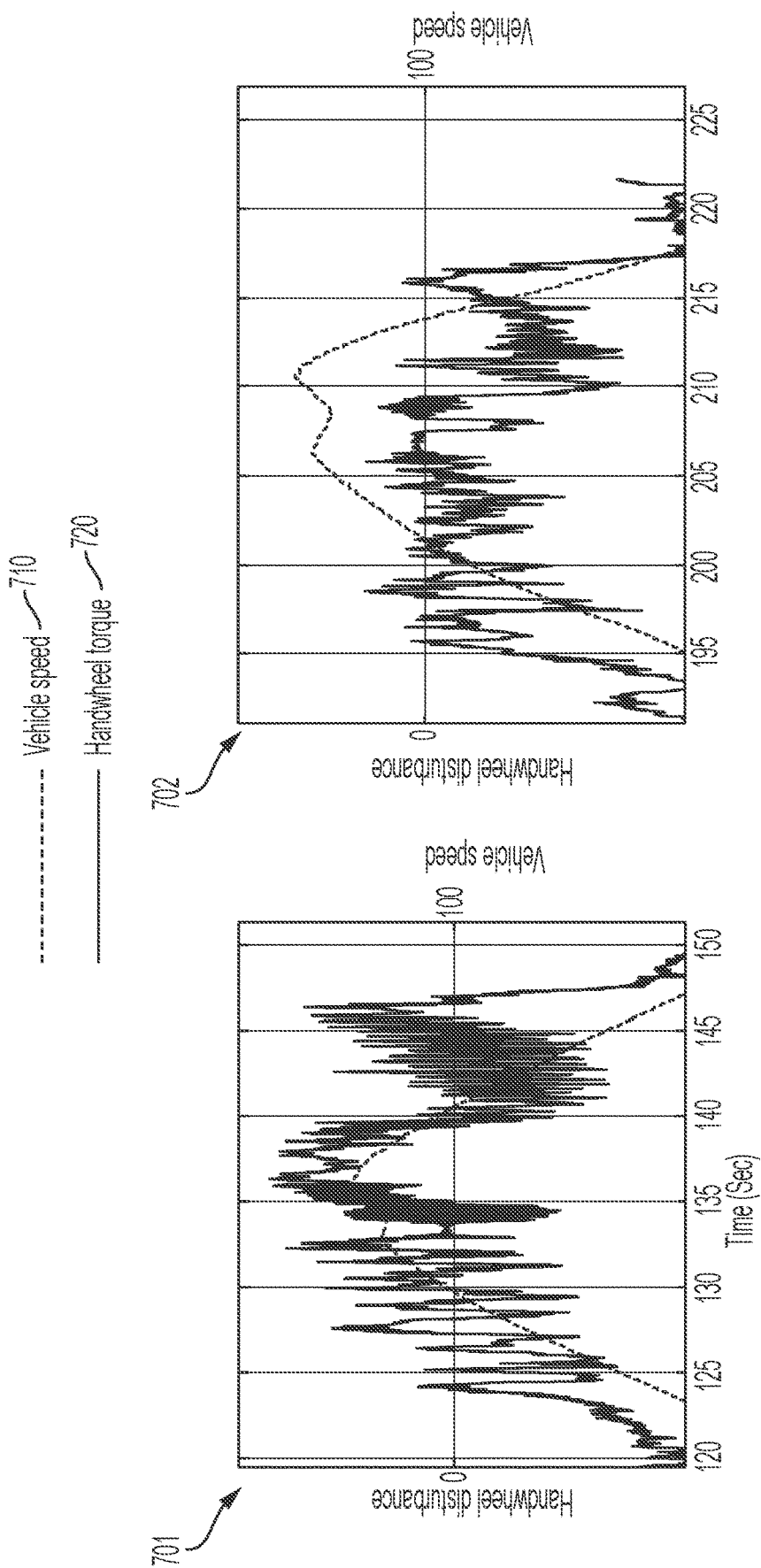
FIGS. 7A and 7B depict handwheel disturbance with and without using technical solutions described herein.

FIGS. 7A and 7B depict handwheel disturbance with and without using technical solutions described herein. As vehicle speed 710 changes, handwheel torque 720 without using the scaling under acceleration is shown in plot 701 and the handwheel torque 720 with the scaling factors described herein under acceleration are shown in plot 702. As can be seen, there is less undesirable oscillation when the scaling factors described herein are in use (702).

Further, the damping dependent scaling can also be used to improve a similar technical challenge of undesired steering vibrations during braking due to brake disk thickness variation. In this case, a similar structure is used for the implementation as shown in FIG. 3, with the scaling factor calculation 310 including both, the enable block 410 and the scale calculator block 420. However, the enable block 410 for the braking case determines the enable conditions based on the vehicle deceleration, rather than acceleration, and further, the enable checks for velocity is lower than a predetermined value rather than greater than (as in FIG. 5).

Figure 8:
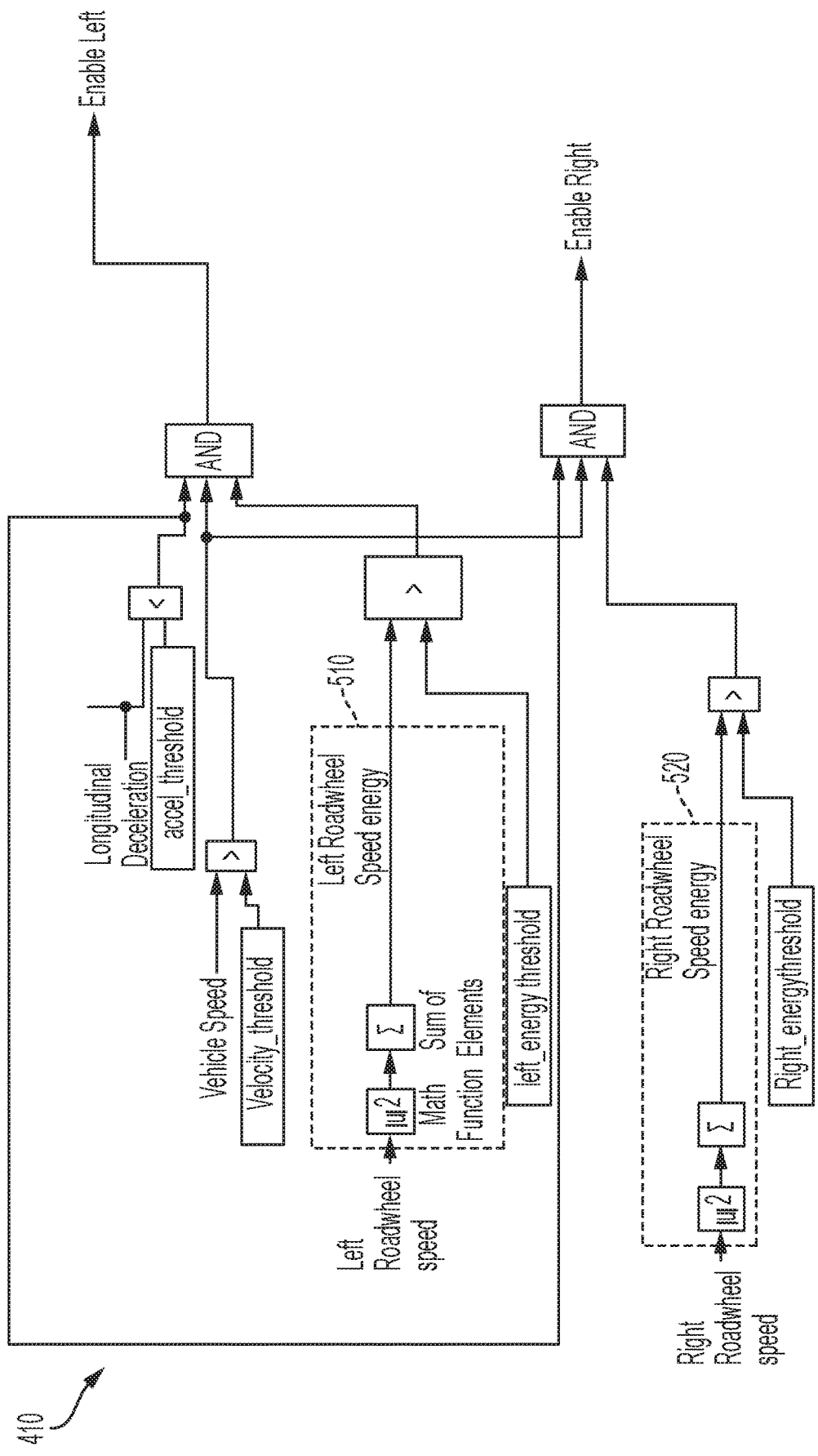
FIG. 8 depicts a block diagram for the enable block for the braking case according to one or more embodiments.

FIG. 8 depicts a block diagram for the enable block for the braking case according to one or more embodiments. The enable left and enable right signals are output using the same components as those described with regard to FIG. 5. Particularly the vehicle speed and the roadwheel speed energy (computed using roadwheel speed) values are used in the same manner. Instead of longitudinal acceleration, the vehicle's deceleration is used in this case and is compared with a predetermined longitudinal deceleration threshold to ensure that the deceleration value is less than the predetermined longitudinal deceleration threshold. In one or more examples, the predetermined longitudinal deceleration threshold value can have the same value as the predetermined longitudinal acceleration threshold value. The enable left and the enable right signals are output to the scale factor block (FIG. 6) to compute the left scaling factor and the right scaling factor. The lookup table (610) used to calculate the scale factors based on velocity is used other way round in case of the braking, that is the scale factor values increase with decrease in vehicle speed.

The technical solutions described herein, thus facilitate damping dependent scaling for reducing wheel imbalance induced vibration in steering systems. The technical solutions described herein facilitate scaling the wheel speeds based on velocity, acceleration, and wheel speed energy. The technical solutions described herein further facilitate knowing if the roadwheel(s) are loaded or not based on calculation of the roadwheel speed energy signal.

While one or more embodiments of the invention have been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

What is claimed is:

1. A method for damping dependent scaling for reducing wheel imbalance in a steering system, the method comprising:
determining roadwheel speed energy using a roadwheel speed signal;
determining that the roadwheel speed energy is greater than a predetermined energy threshold, and in response:
adjusting the roadwheel speed signal; and
computing a wheel imbalance reduction command using the adjusted roadwheel speed signal;
determining that the roadwheel speed energy is not greater than the predetermined energy threshold, and in response computing the wheel imbalance reduction command using the roadwheel speed signal; and
computing a motor torque command using the wheel imbalance reduction command, the motor torque command used to generate a corresponding amount of torque at a handwheel.

2. The method of claim 1, wherein adjusting the roadwheel speed signal includes scaling the roadwheel speed signal.

3. The method of claim 1, wherein adjusting the roadwheel speed signal comprises:
computing a scaling factor using a vehicle speed; and
scaling the roadwheel speed signal using the scaling factor.

4. The method of claim 1, wherein the roadwheel speed signal includes at least one of a left roadwheel speed signal and a right roadwheel speed signal.

5. The method of claim 1, further comprises:
adjusting the roadwheel speed signal based on a determination that the roadwheel speed energy is greater than the predetermined energy threshold, a vehicle speed is greater than a predetermined vehicle speed threshold, and a vehicle acceleration is greater than a predetermined acceleration threshold.

6. The method of claim 1, further comprises:
adjusting the roadwheel speed signal based on a determination that the roadwheel speed energy is greater than the predetermined energy threshold, a vehicle speed is greater than a predetermined vehicle speed threshold, and a vehicle acceleration is greater than a predetermined deceleration threshold.

7. The method of claim 1, wherein the wheel imbalance reduction command is further computed based on an input handwheel torque.

8. A steering system comprising:
a processor configured to perform a damping dependent scaling for reducing wheel imbalance, the damping dependent scaling comprising:
determining roadwheel speed energy using a roadwheel speed signal;
determining that the roadwheel speed energy is greater than a predetermined energy threshold, and in response:
adjusting the roadwheel speed signal;
computing a wheel imbalance reduction command using the adjusted roadwheel speed signal;
determining that the roadwheel speed energy is not greater than the predetermined energy threshold, and in response computing the wheel imbalance reduction command using the roadwheel speed signal; and
computing a motor torque command using the wheel imbalance reduction command, the motor torque command used to generate a corresponding amount of torque at a handwheel.

9. The steering system of claim 8, wherein adjusting the roadwheel speed signal includes scaling the roadwheel speed signal.

10. The steering system of claim 8, wherein adjusting the roadwheel speed signal comprises:
computing a scaling factor using a vehicle speed; and
scaling the roadwheel speed signal using the scaling factor.

11. The steering system of claim 8, wherein the roadwheel speed signal includes at least one of a left roadwheel speed signal and a right roadwheel speed signal.

12. The steering system of claim 8, wherein the damping dependent scaling further comprises:
adjusting the roadwheel speed signal based on a determination that the roadwheel speed energy is greater than the predetermined energy threshold, a vehicle speed is greater than a predetermined vehicle speed threshold, and a vehicle acceleration is greater than a predetermined acceleration threshold.

13. The steering system of claim 8, wherein the damping dependent scaling further comprises:
adjusting the roadwheel speed signal based on a determination that the roadwheel speed energy is greater than the predetermined energy threshold, a vehicle speed is greater than a predetermined vehicle speed threshold, and a vehicle acceleration is greater than a predetermined deceleration threshold.

14. The steering system of claim 8, wherein the wheel imbalance reduction command is further computed based on an input handwheel torque.

15. A computer program product comprising computer executable instructions stored on a non-transitory computer readable memory, the computer executable instructions when executed by a processor cause the processor to perform a method for damping dependent scaling for reducing wheel imbalance in a steering system, the method comprising:
determining roadwheel speed energy using a roadwheel speed signal;
determining that the roadwheel speed energy is greater than a predetermined energy threshold, and in response:
adjusting the roadwheel speed signal;
computing a wheel imbalance reduction command using the adjusted roadwheel speed signal;
determining that the roadwheel speed energy is not greater than the predetermined energy threshold, and in response computing the wheel imbalance reduction command using the roadwheel speed signal; and
computing a motor torque command using the wheel imbalance reduction command, the motor torque command used to generate a corresponding amount of torque at a handwheel.

16. The computer program product of claim 15, wherein adjusting the roadwheel speed signal includes scaling the roadwheel speed signal.

17. The computer program product of claim 15, wherein adjusting the roadwheel speed signal comprises:
   computing a scaling factor using a vehicle speed; and
   scaling the roadwheel speed signal using the scaling factor.

18. The computer program product of claim 15, wherein the roadwheel speed signal includes at least one of a left roadwheel speed signal and a right roadwheel speed signal.

19. The computer program product of claim 15, wherein the method further comprises:
   adjusting the roadwheel speed signal based on a determination that the roadwheel speed energy is greater than the predetermined energy threshold, a vehicle speed is greater than a predetermined vehicle speed threshold, and a vehicle acceleration is greater than a predetermined acceleration threshold.

20. The computer program product of claim 15, wherein the method further comprises:
   adjusting the roadwheel speed signal based on a determination that the roadwheel speed energy is greater than the predetermined energy threshold, a vehicle speed is greater than a predetermined vehicle speed threshold, and a vehicle acceleration is greater than a predetermined deceleration threshold.

* * * * *